United States Patent [19]
Bonnett

[11] 3,788,053
[45] Jan. 29, 1974

[54] WINDROW CONTROLLER

[76] Inventor: Charles O. Bonnett, RR 1, Howard, Kans. 67349

[22] Filed: May 30, 1972

[21] Appl. No.: 257,827

[52] U.S. Cl.................. 56/399, 56/377, 56/DIG. 21
[51] Int. Cl............................................ A01d 77/06
[58] Field of Search 56/377, 399, 13.4, 320.2, DIG. 21

[56] References Cited
UNITED STATES PATENTS
2,625,000   1/1953   Benbow................................ 56/399
3,636,686   1/1972   Meyer et al........................ 56/320.2
3,706,190   12/1972  Taub..................................... 56/13.4

Primary Examiner—Russell R. Kinsey
Attorney, Agent, or Firm—John H. Widdowson; John W. Carpenter

[57] ABSTRACT

An upright shield is attached at the discharge end of a crop conditioning apparatus which is used in a field of previously cut crops to rake the crop transverse to the line of motion and discharge it to one end thereof. The shield is mounted transverse the crop conditioning apparatus. In operation it receives discharged material and limits the outward movement of the material relative the crop conditioning apparatus.

10 Claims, 5 Drawing Figures

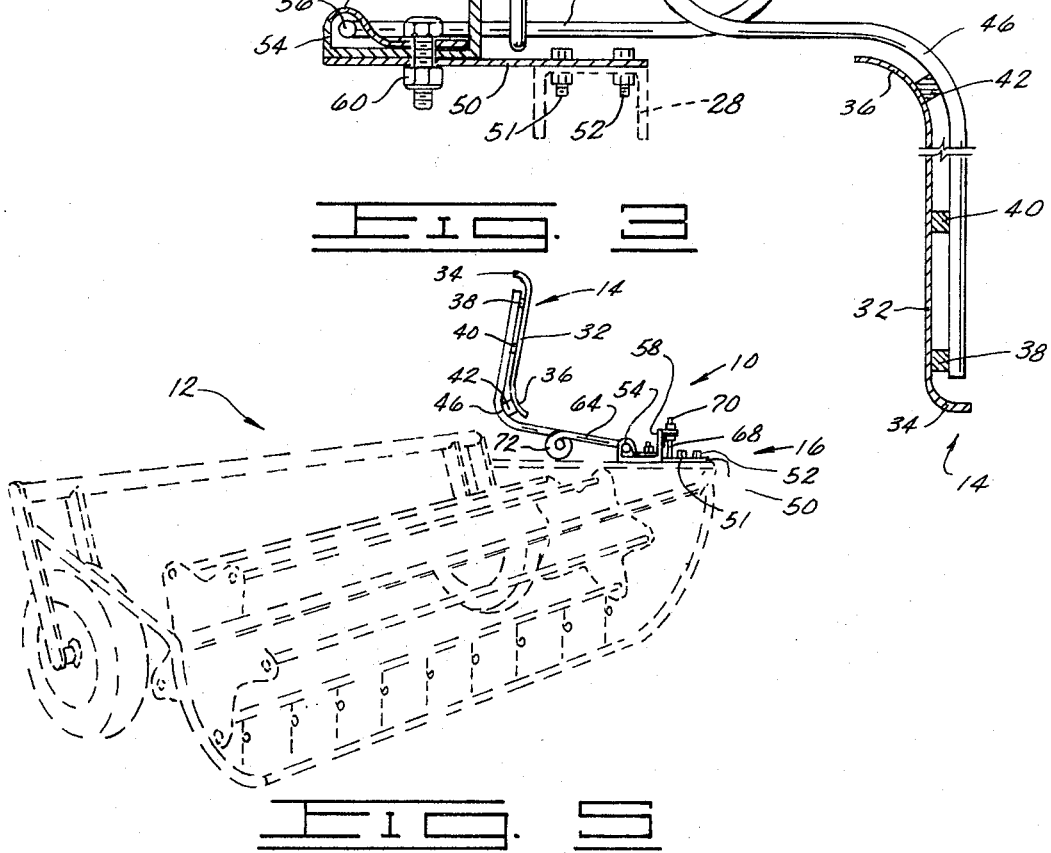

WINDROW CONTROLLER

Numerous types of windrow controlling devices are known in the prior art as operable to form previously cut materials, such as hay and the like into rows behind or alongside pieces of crop conditioning apparatus. Crop conditioning devices are constructed in several basically different styles. Heretofore the windrow controlling devices have been adapted to control the width of the rwo produced by a crop conditioning device which takes the crop in on its forward portion and discharges it on its rear portion. The windrow controlling apparatus for this type of device is usually a gate-like assembly on the rear of the apparatus to control the width and position of the row. Additional crop conditioning devices are known as hayrakes wherein they move the previously cut crops to one side of the machine by means of several rotary rakes along the structure. These devices move the previously cut crop which is lying on the ground into a row at one end of the hayrake. The hayrake is used to rake previously cut material to where it can be picked up by some type of gathering or baling apparatus at a later time. Normally, the hayrake apparatus will produce a fairly uniform row at one end thereof under a no-wind condition. However, when the wind is blowing transverse to the direction of the hayrake, the wind will cause the row to expand and be deformed by blowing the material as it is discharged from the hayrake. Heretofore there has not been any known windrow controlling device particularly adapted for use with hayrakes such as the type described.

In one preferred specific embodiment a windrow controller structure of this invention includes a shield being mountable with the discharge portion of a hayrake apparatus adapted in operation to control the row of material produced by the hayrake The windrow controller structure includes an upright shield supported by resilient arms which are mountable with the structure of a hayrake and place the shield at the disk harge end thereof. The shield an arms are resilient and flexible thereby adapted to move upon impact of material discharged from the hayrake apparatus. The windrow controller of this invention has a normal operating position adjacent to the end of the hayrake structure and a storage position above the end portion of the hayrake structure. The storage position enables the shield to be carried during road transport of the hayrake vehicle.

One object of this invention is to provide a windrow controller overcoming the aforementioned disadvantages of the prior art devices.

Still, one other object of this invention is to provide a windrow controller adapted for use with crop conditioning vehicles that are adapted to rake previously cut material in a field transverse to the line of motion of the vehicle.

Still, another object of this invention is to provide a windrow controller structure which is adapted to be easily mountable with the structure of a hayrake or other crop conditioning vehicle and adapted to control the material discharge row produced thereby.

Yet, another object of this invention is to provide a windrow controller structure which has a resiliently mounted shield securable to a hayrake vehicle structure or other crop conditioning device on the discharge end thereof which is adapted to receive on impact material discharged from the vehicle and form same in a uniform row along the discharge end portion of the vehicle.

Yet, another object of this invention is to provide a windrow controller structure pivotally mountable with a hayrake vehicle adapted to be positioned in a normal use position adjacent to the discharge end of the vehicle and have a second storage position above the vehicle.

Various other objects, advantages, and features of the invention will become apparent to those skilled in the art from the following discussion, taken in conjunction with the accompanying drawings, in which:

FIG. 2 is a perspective view of the windrow controller structure alone in the operating position taken from the outer end and above;

FIG. 3 is an end elevation view of the windrow controller alone, having the shield portion thereof shortened for clarity;

FIG. 5 is a perspective view of the hayrake structure with the windrow controller, having the windrow controller in the storage position and showing the hayrake in dashed lines.

Figure 1:
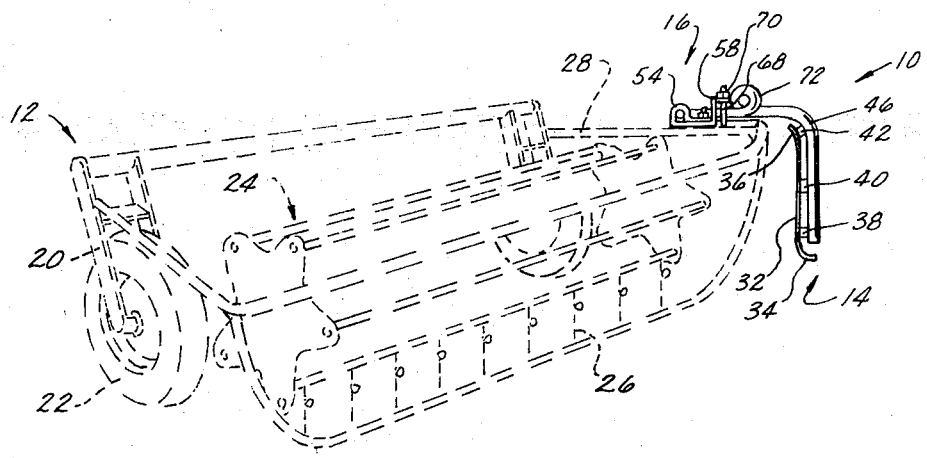
FIG. 1 is a perspective view of a hayrake structure with the windrow controller attached to the discharge end portion thereof in the operating position, having the hayrake structure shown in dashed lines.

The following is a discussion and description of preferred spec fic embodiments of the windrow controller structure of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a windrow controller structure of this invention, indicated at 10, is shown with a hayrake structure generally indicated at 12. The windrow controller structure 10 is mounted at the discharge end portion of the hayrake structure and includes a shield 14 supported by a mounting apparatus 16 that is secured to the frame structure of the hayrake 12.

The hayrake structure 12 on which the windrow controller of this invention is preferably used is a wheeled vehicle having a raking mechanism adapted to move a plurality of cut material along the vehicle and discharge it to one end thereof. In normal operation of the hayrake vehicle 12 alone it is pulled through a field of previously harvested crops which comprises cut material lying on the ground. As the hayrake vehicle is pulled through the field, its structure is transverse to the direction of motion in which it is being pulled, and the material is moved to one end of the vehicle and discharged from the raking apparatus to fall in a row alongside that end of the vehicle. In the agricultural industry there are several makes and different designs of hayrake vehicles available, each of which operate similarly in the same way as described and are used to form rows of cut material to be picked up at a later time by other equipment for storage and further processing. The hayrake vehicle 12 includes a frame structure 20 supported above ground on wheels 22. The frame 20 is an elongated structure with a wheel assembly 22 at the end portions thereof. The raking mechanism, generally indicated at 24, is supported on the hayrake frame structure 20 and has a plurality of prongs 26 adapted to move in ontact with the ground thereby raking material toward one end of the hayrake structure. The end of the hayraKe structure 12 to which material is moved is hereinafter referred to as the discharge end of the hayrake. The windrow controller 10 is mounted on the discharge end portion of the hayrake frame, that portion of the structure indicated at 28. Specifically, the mounting apparatus 16 is secured to the discharge end portion of the hayrake frame 28 as shown in FIG. 1 and FIG. 5.

FIG. 2 and FIG. 3 show in detail the structure of the windrow controller 10 and the shield mounting apparatus 16. The shield portion of the windrow controller 10 is preferably a rectangular shaped sheet-like member 30 having a flat center portion 32, an outwardly curved lower portion 34, and an inwardly curved upper portion 36. The shield 30 has a plurality of stringers secured thereto to stabilize the structure. The shield sheet 30 has a lower stringer 38 on its outward and curved lower portion 34, a center stringer 40 on its flat center portion 32 and an upper stringer 42 on its inner curved upper portion 36. The stringers 38, 40, and 42 are secured to the arms 46 of the mounting apparatus 16. The shield sheet 30 is preferably constructed of a thin and somewhat flexible material so it will flex with the arms 46 slightly upon impact of material discharged from the hayrake vehicle 12 and so that it will move under any prevalent wind forces a slight amount yet maintain its substantially upright position when in the lowered position.

Figure 4:
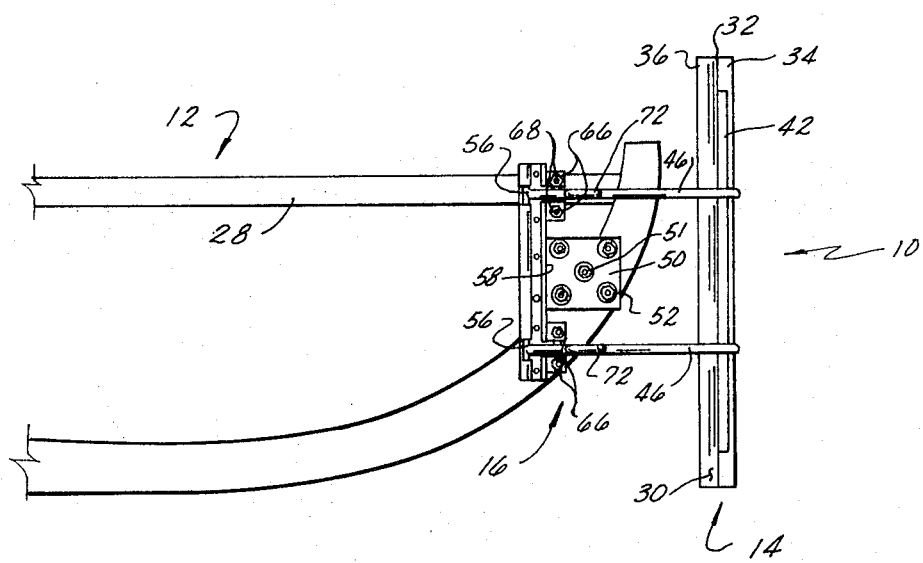
FIG. 4 is a top plan view of the outer end portion of the hayrake structure with the windrow controller attached thereto and n the operating position.

FIG. 2, FIG. 3, and FIG. 4 show the details of the mounting apparatus portion of the windrow controller 10. The mounting apparatus 16 includes a mounting plate 50 securable to the hayrake frame structure 28 by bolts 52, the shield support arms 46, and an arm support structure. The mounting plate 50 is an elongated member having a plurality of holes in one end portion thereof adapted to receive bolts 51 and 52 securing it to the hayrake frame 28, and on its opposite end having an arm pivot bracket 54 to engage the end portion 56 of the arms 46, and an arm support bracket 58. The arm support bracket 58 is an elongated upright member attached perpendicular to the mounting plate 50 as can be seen in FIG. 3 and FIG. 4. The arms 46 are attached to the arm pivot bracket 54 wherein the end portion 56 of the arm 46 is turned to be inserted in the looped portion 57 in a hinge-like manner as shown in FIG. 3. The arm pivot bracket 54 is held in place on the mounting plate 50 by bolts 60. The arm support bracket 58 has a pair of notches, one in each of its outer end portions, as indicated at 62 which allows the straight end portion 64 of the arm 46 to pass through the arm support bracket 58.

The arm support bracket 58 has outward extending portions 66 adjacent to the sides of the notches 62 extending as shown in the drawings through which U-bolts 68 are mounted and secured with locking nuts 70. The U-bolts 68 support the straight portion 64 of the arm and provide adjustment in the vertical position of the shield 14 when in the operating position by pivoting the arm 46 in the arm pivot bracket 54. This adjustment is done by controlling the depth to which the straight portion 64 of the arm 46 will pass into the aperture 62. The arm 46 is supported on its mounted end portion 56 by the arm support bracket in the straight section thereof 64 by the U-bolts 68. Adjustment of the U-bolts 68 by the locking nuts 70 provides vertical adjustment of the shield 14 when in a lowered position on the hayrake structure 12. The arms 46 are preferably constructed of a resilient spring-like material, and to further assist their springing action are provided a loop portion 72 between the end of their straight section 64 and their outer portion. The arms 46 on their outer end portion are preferably curved to contour with the shape of the shield 14.

The mounting plate 50 is constructed to be secured with the outer end frame portion 28 of the hayrake structure 12 by two bolts and secured with that structure so as to be pivotable in a horizontal relation. The mounting plate 50 is adapted to change the horizontal angle of the shield 14 with respect to the hayrake frame 20. FIG. 4 shows the mounting plate structure in some detail. The mounting plate 50 is constructed with a plurality of apertures arranged in a circular pattern having one in the center thereof. The center aperture is adapted to receive the center line bolt 51, and one of the outer apertures is adapted to receive an outer mounting bolt 52. Two apertures are provided through the hayrake outer frame end portion 28 thereby securing the mounting plate 50 by the two bolts 51 and 52. The mounting plate 50 is turnable in its relation to the frame by placing the second bolt 52 through any one of the apertures in the mounting plate and upon rotating in a horizontal manner the mounting plate and attached structure. Adjustment of the angular relation of the shield 14 to the overall hayrake frame 20 makes the windrow controller 10 more versatile because the hayrake 12 may be pulled at different angular inclinations relative to its direction of motion; that is, the hayrake 12 may be of the type which is adjustable in its swath by changing the angle at which the raking mechanism 24 is oriented relative to the direction in which the hayrake 12 is pulled; in such instance the shield 14 can be turned so as to align with general direction of motion of the vehicle.

The shield arm support apparatus is shown in detail in FIG. 2 and FIG. 3. The arms which support the shield 14 are pivotally mounted in the arm pivot bracket so that the arm 46 will pivot vertically about its one end 56. FIG. 1 shows the shield 14 in the normal use position, or the first position where it is carried when the hayrake is in operation. FIG. 2 shows the shield in the raised or storage position or second position where it can be carried when the hayrake 12 is not in use such as in road transport of the vehicle. In the storage position the shield 14 and supporting arms 46 are laid back onto the end portion of the hayrake frame structure 28.

When in the normal use position, the vertical position of the shield structure 14 relative to the overall hayrake frame 20 is determined by thee U-bolts 68. The lowermost position of the shield structure 14 is determined by the position of the bottom of the U-bolt 68 with the straight segment 64 of the arm 46 resting therein. Adjustment of the vertical position fr the shield structure 14 is provided to enable some versatility and use of the windrow controller 10 and make it more effective in the controlling of windrows. Adjustment of the vertical position of the shield 14 is accomplished by simply setting the lock nuts 70 on the U-bolts. Preferably, each of the U-bolts 68 on each of the two arms 46 are set similarly so the shield 14 is in a uniform position relative to the overall hayrake frame 20 and additionally so the shield's lower curved portion 34 is in a parallel relation to the ground. It is to be noted that with the individual arm adjustment capability of the windrow controller structure, one end of the shield 14 can be set higher or lower than te other. Vertical adjustment of the shield 14 relative to the ground is desirable so it can be properly positioned relative to the discharge of the hayrake 12 in order that a maximum of the cut crop material is impacted on the hayrake shield surface 30, and to prevent material from passing under it, and also to provide the most blocking of any wind blowing transverse to the hayrake. The overall effect of making the shield 14 adjustable is to produce the most uniform rwo of material in the raking operation by compensating for particular conditions.

In the hayraking operation and use of the windrow controller 10 of this invention with a hayrake 12, the windrow controller shield 14 is put in the lowered or first position prior to starting of the actual raking and is adjusted to the desired position by means of the U-bolts 68 and lock nuts 70 on the arm apparatus 16. When the shield 14 is properly adjusted, the raking operation may proceed wherein the hayrake 12 is used in the normal manner while usually pulled through a field of previously cut material wherein the rake mechanism 24 moves the material toward the discharge end of the apparatus. As material strikes the shield 14 of the windrow controller 10, the arms 46 supporting the shield allow the shield 14 to move in and out of flex in some amount due to the material impacting on its inner side and the force of any prevailing wind. As material contacts the shield 14, it is prevented from further outward travel relative to the hayrake apparatus 12 by the shield 14 limiting the outer boundary of the row. When the hayrake 12 is pulled such that wind is blowing on the outer side of the shield 14, the shield 14 lessens the amount of material blown back into the raking apparatus and the extent to which the row is scattered before the material settles to the ground. When the hayrake is pulled in a direction such that wind is blowing on the inner side of the shield 14, the shield 14 prevents material which is airborne from scattering beyond the shield 14 and spreading the row before the material settles to the ground. When the haybrake is pulled in a direction into or away from the prevailing wind, the shield 14 is more or less aligned with the direction of motion of the haybrake 12 and direction of the wind; in this condition the shield 14 of the windrow controller 10 prevents a scattering of the material by confining its travel in a direction transverse to the direction of the wind by limiting its outward movement from the haybrake 12.

In the manufacture of the windrow controller structure of this invention, it is obvious that the shield structure 14 and mounting apparatus 16 of the windrow controller structure 10 can be produced by similar techniques currently used in the manufacture of agricultural equipment. The shield 14 is preferably constructed of a relatively lightweight flexible material so as not to burden the haybrake 12 with excessive weight and so that it can be somewhat freely moved and flexed by the impact of material in its resilient supported position on the arms of the mounting apparatus. The mounting apparatus 16 is preferably constructed with resilient spring-like arm members 46 to support the shield 14 and is provided with simple adjustments for the vertical and rotational position of the shield structure 14 relative to the entire haybrake frame 20.

In the use and operation of the windrow controller structure of this invention, it is seen that same provides a simple, easily usable and easily adjustable means of controlling the windrow produced by a crop conditioning apparatus that discharges material to one end thereof. The windrow controller structure which is provided is positionable in a normal use position and in a second storage position and easily removable between the two. When positioned for use the windrow controller structure of this invention can be adjusted for the maximum control of a windrow to prevent dispersion of the material discharged from a crop conditioning apparatus which is adapted to rake the material to one side of the crop conditioning apparatus.

As will become apparent from the foregoing description of the applicant's windrow controller structure, relatively inexpensive and simple means have been provided to control the windrow produced by a crop conditioning apparatus that is adapted to rake material to one side of the apparatus and discharge it into a row. The windrow controller is economical to manufacture, very simple to use, easily adjustable to provide a maximum of control for the windrow and can be carried with the crop conditioning apparatus in a storage position when not being used.

While the invention has been described in conjunction with preferred specific embodiments thereof, it will be understood that this description is intended to illustrate and not to limit the scope of the invention, which is defined by the following claims.

I claim:

1. In a crop conditioning apparatus adapted to move in a field of previously cut crops having a frame supporting a means to rake said cut crops transverse to the line of motion of said crop conditioning apparatus and discharge said raked cut crops to one end of said apparatus, the improvement comprising an upright deflector sheidl, at least two resilient support arms conn ecting to said shield and extending away from said crop conditioning apparatus, and means for mounting said support arms attached to said frame, and said support arms are pivotally connected to said means for mounting and include a structure defining a loop for additional resiliency.

2. The crop conditioning apparatus of claim 1 wherein said deflector shield is essentially rectangular and includes a plurality of stringer members attached thereto, said stringer members longitudinally traverse said shield, and said support arms generally extend across the entire width of said shield and crosswise connect to said stringer members.

3. The cro conditioning apparatus of claim 1 wherein said means for mounting comprises a substantially L-shaped mounting frame whose base includes an end essentially defining a hollow elongated cylinder and whose side includes at least two channeled grooves, and a pivot bar rotatably lodging within said hollow cylindrical end of said L-shaped frame, said hollow end including at least two openings for exposing said pivot bar, and said support arms extend through said openings to connect with said exposed pivot bar.

4. The crop conditioning apparatus of claim 3 wherein said channeled grooves are essentially U-shaped and in registry with said openings, and said crop conditioning apparatus additionally comprises means for adjusting the position of said shield relative to said crop conditioning apparatus.

5. The crop conditioning apparatus of claim 4 wherein said means for adjusting comprises at least four L-shaped extending members each connecting to said L-shaped mounting frame contiguous to a side of said at least two channeled U-shaped grooves and including a structure havinjg an aperture, at least two generally U-shaped support members each including a first base in contact with said supporting arm and a pair of arms threaded at the ends, each of said arms extend through said aperture, and at least one nut connecting with said threads of each arm to adjust the height of said first base of said U-shaped support members with respect to said L-shaped extending members thereby adjusting the height of said supporting arms and said deflector shield.

6. A crop conditioning apparatus for use in a field of previously cut crops comprising a frame, means secured to said frame constructed and adapted in operation to rake said cut crop transverse to the line of operative motion of said crop conditioning apparatus and discharge said raked cut crop at one end of said conditioning apparatus, an upright deflector shiel d, at least two resilient support arms connected to said shield extending away from said crop conditioning apparatus, said support arms including a structure defining a loop for additional resiliency, and means for mounting said support arms, said means for mounting being attached to said frame and including said support arms pivotally connected therein.

7. The crop conditioning apparatus of claim 6 wherein said deflector shield is essentially rectangular and includes a plurality of stringer members attached thereto, said stringer members longitudinally traverse said shield, and said support arms generally extend across the entire width of said shield and crosswise connect to aid stringer members.

8. The crop conditioning apparatus of claim 6 wherein said means for mounting comprises a substantially L-shaped mounting frame shose base includes an end essentially defining a hollow elongated cylinder and whose side includes at least two channeled grooves, and a pivot bar rotatably loding within said hollow cylindrical end of said L-shaped frame, said hollow end including at least two openings for exposing said pivot bar, and said support arms extend through said openings to connect with said exposed pivot bar.

9. The crop conditioning apparatus of claim 8 wherein said channeled grooves are essentially U-shaped and in registry with said openings, and said crop conditioning apparatus additionally comprises means for adjusting the position of said shield relative to said crop conditioning apparatus.

10. The crop conditioning apparatus of claim 9 wherein said means for adjusting comprises at least four L-shaped extending members each connecting to said L-shaped mounting frame contiguous to a side of said at least two channeled U-shaped grooves and including a structure having an aperture, at least two generally U-shaped support members each including a first base in contact with said supporting arm and a pair of arms threaded at the ends, each of said arms extend through said aperture, and at least one nut connecting with said threads of each arm to adjust the height of said first base of said U-shaped support members with respect to said L-shaped extending members thereby adjusting the height of said supporting arms and said deflector shield.

* * * * *

UNITED STATES PATENT OFFICE
CERTIFICATE OF CORRECTION

Patent No. 3,788,053                    Dated January 29, 1974

Inventor(s)    Charles O. Bonnett

It is certified that error appears in the above-identified patent and that said Letters Patent are hereby corrected as shown below:

Column 1, line 10, "rwo" should read -- row --; line 14, after "apparatus" insert -- adapted --; line 40, "disk harge" should read -- discharge --. Column 2, line 25, "n" should read -- in --; line 31, "spec fic" should read -- specific --. Column 3, line 3, "ontact" should read -- contact --; line 5, "hayraKe" should read -- hayrake --. Column 4, line 55, "thee" should read -- the --; line 59, "fr" should read -- for --. Column 5, line 5, "te" should read -- the --; line 13, "rwo" should read -- row --; line 44, 47, 51, 59 and 67, "haybrake", each occurrence, should read -- hayrake --. Column 6, line 38, "sheidl" should read -- shield --; line 38, "conn ecting" should read -- connecting --; line 52, "cro" should read -- crop --. Column 7, line 6, "havinjg" should read -- having --; line 22, "shiel d" should read -- shield --. Column 8, line 2, "aid" should read -- said --; line 5, "shose" should read -- whose --; line 8, "loding" should read -- lodging --.

Signed and sealed this 1st day of October 1974.

(SEAL)
Attest:

RUDY M. GIBSON JR.
Attesting Officer

C. MARSHALL DANN
Commissioner of Patents